United States Patent
Heo et al.

(10) Patent No.: US 10,305,123 B2
(45) Date of Patent: May 28, 2019

(54) FUEL CELL SEPARATOR WITH GASKET FOR IMPROVED SEALING

(71) Applicant: Hyundai Motor Company, Seoul (KR)

(72) Inventors: Seong Il Heo, Gyeonggi-do (KR); Chi Seung Lee, Gyeonggi-do (KR); Yoo Chang Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 259 days.

(21) Appl. No.: 15/196,485

(22) Filed: Jun. 29, 2016

(65) Prior Publication Data

US 2017/0018786 A1  Jan. 19, 2017

(30) Foreign Application Priority Data

Jul. 13, 2015 (KR) .................. 10-2015-0098854

(51) Int. Cl.
*H01M 8/0276* (2016.01)
*H01M 8/04082* (2016.01)
*H01M 8/1018* (2016.01)

(52) U.S. Cl.
CPC ..... *H01M 8/0278* (2013.01); *H01M 8/04201* (2013.01); *H01M 2008/1095* (2013.01); *H01M 2250/20* (2013.01)

(58) Field of Classification Search
CPC .......... H01M 8/0278; H01M 8/04201; H01M 2250/20; H01M 2008/1095
See application file for complete search history.

(56) References Cited

U.S. PATENT DOCUMENTS

| 7,674,550 B2 | 3/2010 | Wakahoi et al. |
| 2013/0171543 A1 | 7/2013 | Jin et al. |

FOREIGN PATENT DOCUMENTS

| JP | 2004-207071 A | 7/2004 |
| KR | 10-0777124 B1 | 11/2007 |
| KR | 10-0778634 B1 | 11/2007 |
| KR | 10-0807976 B1 | 3/2008 |
| KR | 2011-0015924 A | 2/2011 |
| KR | 2013-0076938 A | 7/2013 |

*Primary Examiner* — Lisa S Park
(74) *Attorney, Agent, or Firm* — Mintz Levin Cohn Ferris Glovsky and Popeo, P.C.; Peter F. Corless

(57) ABSTRACT

A fuel cell separator with a gasket for improved sealing is provided. The fuel cell separator with a gasket is capable of improving the contact pressure of a cooling surface-side airtight line by additionally forming a sub-airtight line in a region in which a gas aperture is not formed at a cooling surface-side position that corresponds to the cooling surface-side airtight line of the separator.

8 Claims, 4 Drawing Sheets

FUEL CELL SEPARATOR WITH GASKET FOR IMPROVED SEALING

CROSS-REFERENCE TO RELATED APPLICATION

This application claims under 35 U.S.C. § 119(a) the benefit of priority to Korean Patent Application No. 10-2015-0098854 filed on Jul. 13, 2015, the entire contents of which are incorporated herein by reference.

BACKGROUND (a) Technical Field

The present disclosure relates to a fuel cell separator with a gasket for improved sealing, and more particularly, to a fuel cell separator with a gasket that improves the contact pressure thereof.

(b) Background Art

As is well known in the art, a fuel cell stack includes a membrane electrode assembly (MEA) disposed at the innermost side thereof. The MEA includes a polymer electrolyte membrane through which protons may be moved, and catalyst layers, i.e. a cathode (air electrode) and an anode (fuel electrode), which are applied to both surfaces of the polymer electrolyte membrane such that hydrogen reacts with oxygen.

In addition, the fuel cell stack includes a gas diffusion layer (GDL) and a gasket which are sequentially stacked at the exterior of the electrolyte membrane, i.e. at the portion in which the cathode and the anode are disposed, a separator disposed at the exterior of the GDL and formed with a flow field through which fuel is supplied and water generated by reaction is discharged, and an end plate coupled to the outermost side thereof for supporting and fixing the above components. Accordingly, protons and electrons are generated by the oxidation reaction of hydrogen in the anode of the fuel cell stack. In particular, the generated protons and electrons move to the cathode through the respective electrolyte membrane and the separator. In the cathode, water is generated by the electrochemical reaction of the protons and electrons, which move from the anode, and oxygen in the air, and electric energy is simultaneously generated through the flow of electrons.

In the fuel cell stack, the gasket is attached to the separator to divide each unit cell of the fuel cell stack and functions to independently seal passages of hydrogen, coolant, air, formed on the surface of the separator. Further, to more smoothly perform the function of the gasket, the fuel cell stack is manufactured in consideration of the method of attaching the gasket to the separator and the selection of gasket materials.

In other words, the bonding structure between the separator and the gasket requires a passage sealing function for preventing hydrogen from coming into direct contact with air, a sealing function for preventing coolant from coming into contact with hydrogen and air, a sealing retention function for preventing fluids (e.g., air, hydrogen, and coolant) from flowing out to the outside, etc. In addition, the gasket disposed between the separators provides support force between the separators. The gasket may be manufactured integrally with each separator on both surfaces of the separators by injection molding. Particularly, the gasket may be manufactured to prevent working fluid from leaking due to characteristics of fuel cells in which airtightness (e.g., an airtight seal) is required for reactant gas and cooling fluid.

In connection with the fuel cell separator with the gasket for improved sealing, an apparatus of the related art includes gaskets integrated with separators by injection molding, and the gaskets integrated on both surfaces of the separators by injection molding are continuously connected, thereby forming one closed curve. In addition, the interface between the overall edge of each separator and each manifold is formed with a plurality of injection apertures through which an injection liquid for gasket passes, the injection liquid for gasket flows from one surface of the separator to the opposite surface thereof through the injection apertures, and thus, the gaskets are integrated throughout both surfaces of the separator by injection molding.

Specifically, the structure of a gasket formed at each of reaction and cooling surfaces of a conventional separator will be described with reference to FIGS. 1A-1B of the related art. Each of reaction surfaces 10 and 10' of a separator illustrated in FIGS. 1A-1B is a portion in which a fuel cell reaction occurs. In the reaction surfaces 10 and 10', manifolds 20, 20', 22, 22', 24, and 24' which provide passages for air, coolant, and hydrogen are disposed, and reaction surface-side airtight lines 30a and 30a' are formed to block the movement of reactant gas and cooling fluid. A plurality of gasket support portions 32a and 32a' are formed in parallel from the airtight lines 30a and 30a' to be spaced at predetermined intervals. In addition, the hydrogen or air introduced from cooling surfaces 12 and 12' of the separator moves to the reaction surfaces 10 and 10' through gas through-apertures 40 and 40'.

In addition, each of the cooling surfaces 12 and 12' of the separator is a portion in which heat generated by a chemical reaction is removed. In the cooling surfaces 12 and 12', manifolds 20, 20', 22, 22', 24, and 24' which provides passages for air, coolant, and hydrogen are disposed, and cooling surface-side airtight lines 30b and 30b' are formed to introduce cooling fluid. A plurality of gasket support portions 32b and 32b' are formed in parallel from the airtight lines 30b and 30b' to be spaced at predetermined intervals.

As illustrated in FIGS. 1A-1B, in the gasket, the positions of the cooling surface-side airtight lines 30b and 30b' and the reaction surface-side airtight lines 30a and 30a' differ from each other, and the gasket support portions 32b and 32b' support the load of the gasket. Accordingly, the contact pressure of each airtight line between the gasket support portions 32b and 32b' may deteriorate, and coolant may leak to the air manifolds 20 and 20' or the hydrogen manifolds 24 and 24'.

The above information disclosed in this section is merely for enhancement of understanding of the background of the invention and therefore it may contain information that does not form the prior art that is already known in this country to a person of ordinary skill in the art.

SUMMARY

The present invention provides a fuel cell separator with a gasket for improved sealing, which is capable of improving the contact pressure of a cooling surface-side airtight line by additionally forming a sub-airtight line in a region in which a gas aperture is not formed at a cooling surface-side position corresponding to the cooling surface-side airtight line of the separator.

In an exemplary embodiment, a fuel cell separator with a gasket for improved sealing is provided and the gasket may have a cooling surface-side and reaction surface-side airtight lines, formed between a manifold portion and a passage surface of the fuel cell separator, and a gasket support portion formed integrally with each of the airtight lines. The gasket may include a sub-airtight line connected to the reaction surface-side airtight line in a region in which a gas aperture is not formed in a region of a reaction surface of the separator that corresponds to the cooling surface-side airtight line.

Further, the gasket may include an air sub-airtight line, as a sub-airtight line formed on an anode reaction surface of the separator, connected to an anode cooling surface-side air airtight line, formed between an air manifold and an anode cooling surface of the separator, in a region in which a hydrogen aperture is not formed in a region of the anode reaction surface that corresponds to the anode cooling surface-side air airtight line. The air sub-airtight line may have a structure in which tips of gasket support portions formed between the air manifold and the anode reaction surface of the separator are integrally connected, and may extend toward the anode reaction surface. The air sub-airtight line may have a width which is equal to or greater than half a width of an air airtight line formed between the air manifold and the anode reaction surface, and which is equal to or less than twice the width of the air airtight line.

Alternatively, the gasket may include a hydrogen sub-airtight line, as a sub-airtight line formed on a cathode reaction surface of the separator, connected to a cathode cooling surface-side hydrogen airtight line, formed between a hydrogen manifold and a cathode cooling surface of the separator, in a region in which an air aperture is not formed in a region of the cathode reaction surface that corresponds to the cathode cooling surface-side hydrogen airtight line. The hydrogen sub-airtight line may have a structure in which tips of gasket support portions formed between the hydrogen manifold and the cathode reaction surface of the separator are integrally connected, and may extend toward the cathode reaction surface. The hydrogen sub-airtight line may have a width which is equal to or greater than half a width of a hydrogen airtight line formed between the hydrogen manifold and the cathode reaction surface, and which is equal to or less than twice the width of the hydrogen airtight line.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1A:
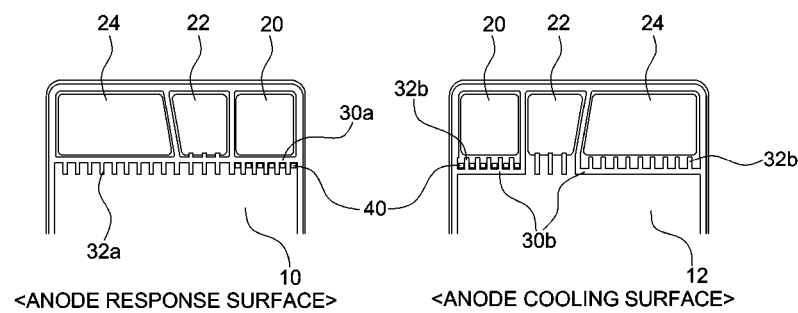
FIGS. 1A-1B are top views illustrating a structure of a gasket formed at each of reaction and cooling surfaces of a separator according to the related art.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 2A:
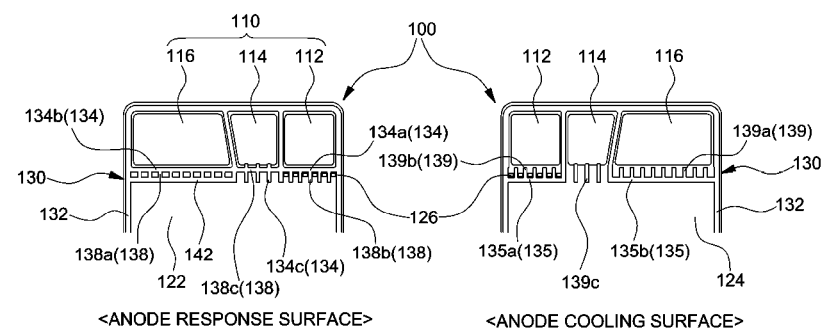
FIGS. 2A-2B are top views illustrating a fuel cell separator with a gasket for improved sealing according to an exemplary embodiment of the present invention.
Figure 2B:
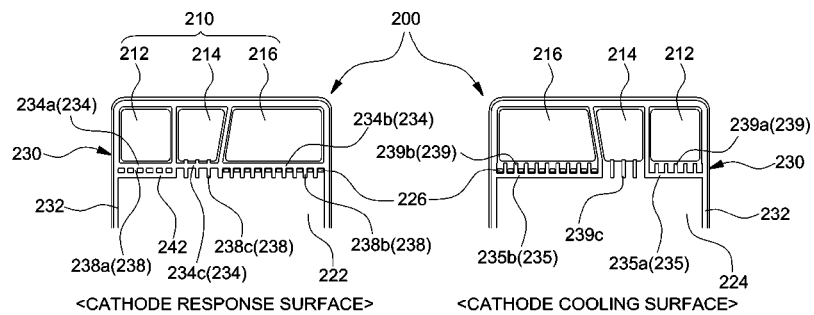

In a fuel cell separator with a gasket for improved sealing according to an exemplary embodiment of the present invention, gaskets may be integrated on both surfaces of each separator by injection molding, and may be continuously connected, thereby forming one closed curve. Referring to FIGS. 2A-2B, fuel cell separators 100 and 200 according to an exemplary embodiment of the present invention may include manifold portions 110 and 210 consisting of hydrogen manifolds 112 and 212 and coolant manifolds 114 and 214, formed at both lateral ends of the separators, and air manifolds 116 and 216, respectively. Passage surfaces (e.g., reaction surface and cooling surface) for reactant gas and cooling fluid may be formed throughout the inner areas of the respective separators 100 and 200.

In particular, the reaction surface (i.e., anode reaction surface) 122 for hydrogen gas and the cooling surface (i.e., anode cooling surface) 124 for coolant may be formed respectively on both surfaces of the anode separator 100 facing the anode of an MEA (not shown). The reaction surface (i.e., cathode reaction surface) 222 for air and the cooling surface (i.e., cathode cooling surface) 224 for coolant may be formed respectively on both surfaces of the cathode separator 200 facing the cathode of the MEA (not shown).

A plurality of gas apertures (e.g., hydrogen apertures) 126 may be arranged in the vertical width direction of the separator 100 between the hydrogen manifold 112, the anode reaction and cooling surfaces 122 and 124 formed at both ends of the anode separator 100. A plurality of gas apertures (e.g., air apertures) 226 may be arranged in the vertical width direction of the separator 100 between the air manifold 216, the cathode reaction and cooling surfaces 222 and 224 formed at both ends of the cathode separator 200. Particularly, the gasket, i.e. the anode gasket 130 provided in the anode separator 100 will be described.

Referring to FIG. 2A, the anode gasket 130 provided in the fuel cell separator according to the exemplary embodiment of the present invention may include a side line 132 and airtight lines 134 and 135, formed on the anode reaction and cooling surfaces 122 and 124 of the separator 100, and a coolant guide line 139c formed on the anode cooling surface 124. The side line 132 may be formed integrally along the overall edge of the separator 100 on both surfaces thereof to block reactant gas or coolant from flowing to the outside (e.g., being discharged).

The airtight lines 134 and 135 may include a reaction surface-side airtight line 134 that integrally extends in the vertical width direction of the separator 100 between the anode reaction surface 122 and the manifold 110 of the separator 100, and a cooling surface-side airtight line 135 that extends in the vertical width direction of the separator 100 between the anode cooling surface 124 and the manifold 110 of the separator 100. Both ends of each of the reaction surface-side airtight line 134 and the cooling surface-side airtight line 135 may be integrally connected to the side line 132.

In particular, the reaction surface-side airtight line 134 may include a reaction surface-side hydrogen airtight line 134a that integrally extends in the vertical width direction of the separator 100 between the hydrogen manifold 112 and the anode reaction surface 122, a reaction surface-side air airtight line 134b that integrally extends in the vertical width direction of the separator 100 between the air manifold 116 and the anode reaction surface 122, and a reaction surface-side coolant airtight line 134c integrally connected between the hydrogen airtight line 134a and the air airtight line 134b and extends in the vertical width direction of the separator 100 between the coolant manifold 114 and the anode reaction surface 122.

In addition, the cooling surface-side airtight line 135 may include a cooling surface-side hydrogen airtight line 135a that integrally extends in the vertical width direction of the separator 100 between the hydrogen manifold 112 and the anode cooling surface 124, and a cooling surface-side air airtight line 135b that integrally extends in the vertical width direction of the separator 100 between the air manifold 116 and the anode cooling surface 124. The reaction surface-side airtight line 134 may be formed integrally with a plurality of gasket support portions 138 that extend from the airtight line 134 to the anode reaction surface 122, and the cooling surface-side airtight line 135 may be formed integrally with a plurality of gasket support portions 139 that extend from the airtight line 135 to the manifold 110.

The cooling surface-side airtight line 135 may be formed with a plurality of gasket support portions 139a that extend from the air airtight line 135b to the air manifold 116 in the lateral width direction of the separator 100, may be formed with a plurality of gasket support portions 139b that extend from the hydrogen airtight line 135a to the hydrogen manifold 112 in the lateral width direction of the separator 100, and may be formed with a plurality of coolant guide lines 139c that extend in the lateral width direction of the separator 100 between the anode cooling surface 124 and the coolant manifold 114.

The plurality of hydrogen apertures 126 may be arranged in the vertical width direction between the hydrogen airtight lines 135a and the hydrogen manifold 112, and each of the hydrogen apertures 126 may be disposed between the gasket support portions 139b. Each of the coolant guide lines 139c may be a gasket support portion, and may be formed integrally with the coolant airtight line 134c of the anode reaction surface 122 to be disposed on the anode cooling surface 124.

In addition, an air sub-airtight line 142 may be formed in a predetermined region of the anode reaction surface 122 that corresponds to the cooling surface-side air airtight line 135b, to improve the contact pressure of the anode cooling surface-side airtight line 135. The air sub-airtight line 142 may be formed integrally with the air airtight line 134b in a region in which the gas apertures 126 are not formed in the predetermined region of the anode reaction surface 122 that corresponds to the anode cooling surface-side airtight line 135 (e.g., in an aperture-free region). The air sub-airtight line 142 may extend to the inside of the air airtight line 134b (i.e. extend to the anode reaction surface 122 from the air manifold 116) and may be formed between the air airtight line 134b and the anode reaction surface 122.

Figure 4:
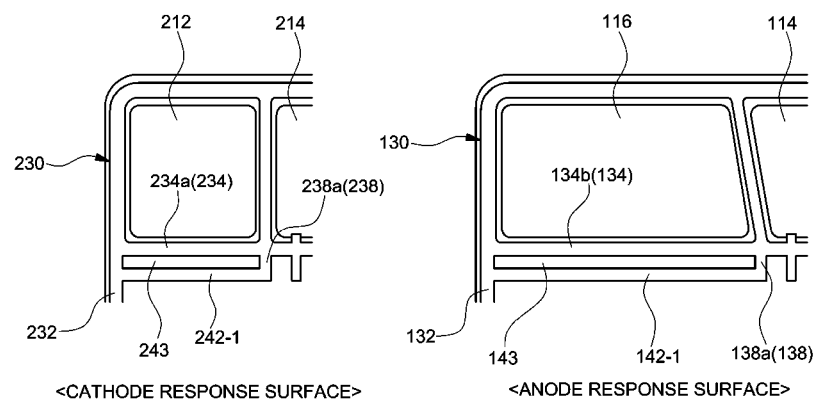
FIG. 4 is an enlarged view illustrating main portions of a fuel cell separator with a gasket for improved sealing according to another exemplary embodiment of the present invention.

For example, as illustrated in FIG. 2A, in the air sub-airtight line 142 the tips of the gasket support portions 138a formed between the air manifold 116 and the anode reaction surface 122 may be integrally connected, and may linearly extend in the vertical width direction of the separator 100. In another example, as illustrated in FIG. 4, an air sub-airtight line 142-1 may extend from an air manifold 116 to an anode reaction surface 122 at a predetermined interval in the vertical width direction of a separator 100, and may be connected to an air airtight line 134b by a side line 132 and a gasket support portion 138a formed at the tip of the air airtight line 134b. In particular, one space portion (e.g., a vacant region in which a gasket material is not applied) 143 may be formed linearly in the vertical width direction of the separator 100 between the air airtight line 134b and the air sub-airtight line 142-1.

Figure 5:
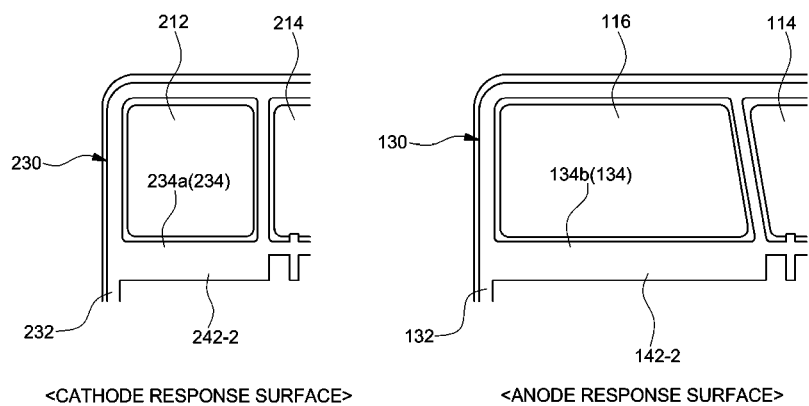
FIG. 5 is an enlarged view illustrating main portions of a fuel cell separator with a gasket for improved sealing according to a further exemplary embodiment of the present invention.

In a further example, as illustrated in FIG. 5, an air sub-airtight line 142-2 may extend to the inside of a separator 100 (i.e., from an air manifold 116 to an anode reaction surface 122) to be formed integrally with an air airtight line 134b, and extend in the vertical width direction of the separator 100. Particularly, a space portion (e.g., a vacant region in which a gasket material is not applied) may not be formed between the air airtight line 134b and the air sub-airtight line 142-2. Further, the air sub-airtight line 142 may be changed in various manners, and is not limited to forms illustrated in FIGS. 2 to 5.

Figure 3:
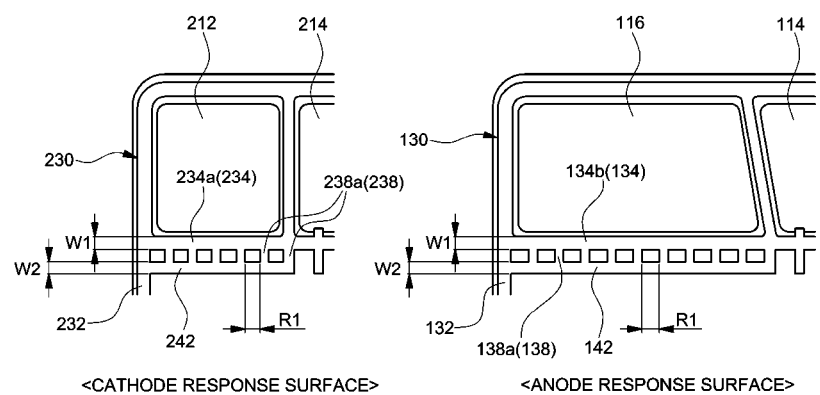
FIG. 3 is an enlarged view illustrating main portions of the fuel cell separator with a gasket for improved sealing according to the exemplary embodiment of the present invention.

Referring to FIG. 3, the air sub-airtight line 142 may have a width (W2) equal to or greater than half the width (W1) of the anode reaction surface-side air airtight line 134b formed between the air manifold 116 and the anode reaction surface 122, and which may be equal to or less than twice the width (W1) of the anode reaction surface-side air airtight line 134b, but the present invention is not limited thereto. When the width (W2) of the air sub-airtight line 142 is less than half the width (W1) of the anode reaction surface-side air airtight line 134b, the injection molding capability of the gasket may deteriorate. When the width (W2) of the air sub-airtight line 142 exceeds twice the width (W1) of the anode reaction surface-side air airtight line 134b, space restriction may occur.

In addition, the gasket in a region (R1) between the gasket support portions 138a between the anode reaction surface-side air airtight line 134b and the anode reaction surface-side air sub-airtight line 142 may have a thickness which is equal to or greater than half the thickness of the gasket in regions other than the above region (R1), and which may be equal to or less than the thickness of the gasket in regions other than the above region (R1), but the present invention is not limited thereto. When the thickness of the gasket in the region (R1) between the gasket support portions 138a is less than half the thickness of the gasket in regions other than the above region (R1), the injection molding capability of the gasket may deteriorate. When the thickness of the gasket in the region (R1) between the gasket support portions 138a exceeds the thickness of the gasket in regions other than the above region (R1), the contact pressure of the gasket may be unbalanced. Particularly, the thickness of the gasket refers to a thickness in the direction in which gaskets 130 are stacked on the separator 100.

Moreover, the gasket, i.e. the cathode gasket 230 provided in the cathode separator 200 will be described. Referring to FIG. 2B, the cathode gasket 230 provided in the fuel cell separator according to the exemplary embodiment of the present invention may include a side line 232 and airtight lines 234 and 235, formed on the cathode reaction and cooling surfaces 222 and 224 of the separator 200, and a coolant guide line 239c formed on the cathode cooling surface 224.

The side line 232 may be formed integrally along the overall edge of the separator 200 on both surfaces thereof to block reactant gas or coolant from flowing to the outside (e.g., from discharging). The airtight lines 234 and 235 may include a reaction surface-side airtight line 234 that integrally extends in the vertical width direction of the separator 200 between the cathode reaction surface 222 and the manifold 210 of the separator 200, and a cooling surface-side airtight line 235 that extends in the vertical width direction of the separator 200 between the cathode cooling surface 224 and the manifold 210 of the separator 200. Both ends of each of the reaction surface-side airtight line 234 and the cooling surface-side airtight line 235 may be integrally connected to the side line 232.

Specifically, the reaction surface-side airtight line 234 may include a cathode reaction surface-side hydrogen airtight line 234a that integrally extends in the vertical width direction of the separator 200 between the hydrogen manifold 212 and the cathode reaction surface 222, a cathode reaction surface-side air airtight line 234b that integrally extends in the vertical width direction of the separator 200 between the air manifold 216 and the cathode reaction surface 222, and a cathode reaction surface-side coolant airtight line 234c integrally connected between the hydrogen airtight line 234a and the air airtight line 234b and that may extend in the vertical width direction of the separator 200 between the coolant manifold 214 and the cathode reaction surface 222.

Furthermore, the cooling surface-side airtight line 235 may include a cathode cooling surface-side hydrogen airtight line 235a that integrally extends in the vertical width direction of the separator 200 between the hydrogen manifold 212 and the cathode cooling surface 224, and a cathode cooling surface-side air airtight line 235b that integrally extends in the vertical width direction of the separator 200 between the air manifold 216 and the cathode cooling surface 224. The reaction surface-side airtight line 234 may be formed integrally with a plurality of gasket support portions 238 that extend from the airtight line 234 to the cathode reaction surface 222, and the cooling surface-side airtight line 235 may be formed integrally with a plurality of gasket support portions 239 that extend from the airtight line 235 to the manifold 210.

In particular, the cooling surface-side airtight line 235 may be formed with a plurality of gasket support portions 239a that extend from the air airtight line 235b to the air manifold 216 in the lateral width direction of the separator 200, may be formed with a plurality of gasket support portions 239b that extend from the hydrogen airtight line 235a to the hydrogen manifold 212 in the lateral width direction of the separator 200, and may be formed with a plurality of coolant guide lines 239c that extend in the lateral width direction of the separator 200 between the cathode cooling surface 224 and the coolant manifold 214.

The plurality of air apertures 226 may be arranged in the vertical width direction between the air airtight lines 234a and the air manifold 216, and each of the air apertures 226 may be disposed between the gasket support portions 238a. Further, each of the coolant guide lines 239c may be a gasket support portion integrally formed with the coolant airtight line 234c of the cathode reaction surface 222 to be disposed on the cathode cooling surface 224.

In addition, a hydrogen sub-airtight line 242 may be formed in a predetermined region of the cathode reaction surface 222 that corresponds to the cathode cooling surface-side hydrogen airtight line 235b, to improve the contact pressure of the cathode cooling surface-side airtight line 235. The hydrogen sub-airtight line 242 may be integrally formed with the hydrogen airtight line 234a in a region in which the air apertures 226 are not formed in the predetermined region of the cathode reaction surface 222 that corresponds to the cathode cooling surface-side airtight line 235. The hydrogen sub-airtight line 242 may extend to the inside of the hydrogen airtight line 234a (i.e. extend to the cathode reaction surface 222 from the hydrogen manifold 212) and may be formed between the hydrogen airtight line 234a and the cathode reaction surface 222.

For example, as illustrated in FIG. 2B, in the hydrogen sub-airtight line 242, the tips of the gasket support portions 238a formed between the hydrogen manifold 212 and the cathode reaction surface 222 may be integrally, and may linearly extend in the vertical width direction of the separator 200. In another example, as illustrated in FIG. 4, a hydrogen sub-airtight line 242-1 may extend from a hydrogen manifold 212 to a cathode reaction surface 222 at a predetermined interval in the vertical width direction of a separator 200, and may be connected to a hydrogen airtight line 234a by a side line 232 and a gasket support portion 238a formed at the tip of the hydrogen airtight line 234a. In particular, one space portion (e.g., a vacant region in which a gasket material is not applied) 234 may be formed linearly in the vertical width direction of the separator 200 between the hydrogen airtight line 234a and the hydrogen sub-airtight line 242-1.

In a further example, as illustrated in FIG. 5, a hydrogen sub-airtight line 242-2 may extend to the inside of a separator 200 (i.e., from a hydrogen manifold 212 to a cathode reaction surface 222) to be formed integrally with a hydrogen airtight line 234a, and extend in the vertical width direction of the separator 200. In particular, a space portion (e.g., a vacant region in which a gasket material is not applied) is not formed between the hydrogen airtight line 234 and the hydrogen sub-airtight line 242-2. Further, the hydrogen sub-airtight line 242 may be changed in various manners, and is not limited to forms illustrated in FIGS. 2 to 5.

The hydrogen sub-airtight line 242 may have a width (W2) equal to or greater than half the width (W1) of the cathode reaction surface-side hydrogen airtight line 234a formed between the hydrogen manifold 212 and the cathode reaction surface 222, and equal to or less than twice the width (W1) of the cathode reaction surface-side hydrogen airtight line 234a, but the present invention is not limited thereto. When the width (W2) of the hydrogen sub-airtight line 242 is less than half the width (W1) of the cathode reaction surface-side hydrogen airtight line 234a, the injection molding capability of the gasket may deteriorate. When the width (W2) of the hydrogen sub-airtight line 242 exceeds two times the width (W1) of the cathode reaction surface-side hydrogen airtight line 234a, space restriction may occur.

In addition, the gasket in a region (R1) between the gasket support portions 238a between the cathode reaction surface-side hydrogen airtight line 234a and the cathode reaction surface-side hydrogen sub-airtight line 242 may have a thickness equal to or greater than half the thickness of the gasket in regions other than the above region (R1), and equal to or less than the thickness of the gasket in regions other than the above region (R1), but the present invention is not limited thereto. When the thickness of the gasket in the region (R1) between the gasket support portions is less than half the thickness of the gasket in regions other than the above region (R1), the injection molding capability of the gasket may deteriorate. When the thickness of the gasket in the region (R1) between the gasket support portions exceeds the thickness of the gasket in regions other than the above region (R1), the contact pressure of the gasket may be unbalanced.

Figure 1B:
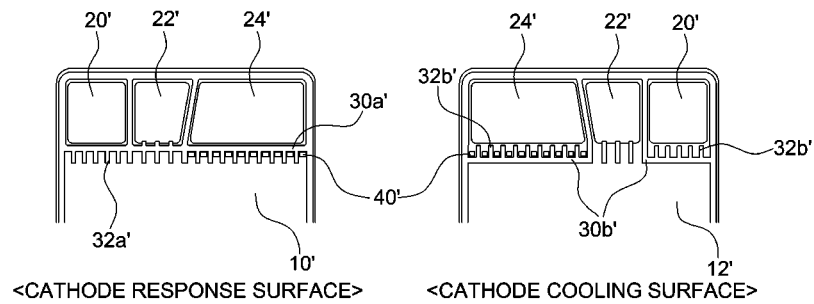
Figure 6:
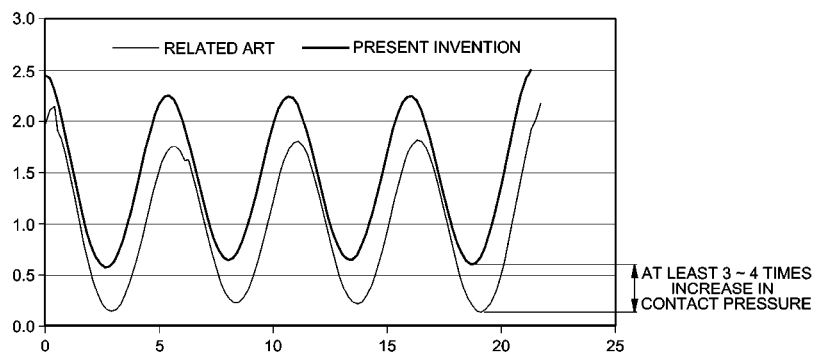
FIG. 6 is a graph illustrating the analyzed result of contact pressure distribution of a cooling surface-side airtight line of each gasket, wherein samples of a separator with the gasket having a sub-airtight line according to the present invention and a separator with the gasket without having a sub-airtight line according to the related art are manufactured to check an improvement in gasket contact pressure of the fuel cell separator with a gasket according to an exemplary embodiment of the present invention.

In particular, to check an improvement in gasket contact pressure of the fuel cell separator with a gasket according to the present invention, after samples of the separator (with the gasket having the sub-airtight line) illustrated in FIGS. 2A-2B and the separator (with the gasket without having the sub-airtight line) illustrated in FIGS. 1A-1B are manufactured, the contact pressure distribution of the cooling surface-side airtight line of each gasket may be analyzed. As a result, as illustrated in FIG. 6, the contact pressure of the separator with the gasket having the sub-airtight line according to the present invention is higher than the contact pressure of the separator with the gasket without having the sub-airtight line according to the related art.

As is apparent from the above description, in accordance with a fuel cell separator with a gasket for improved sealing of the present invention, it may be possible to improve deterioration of the contact pressure of an airtight line between gasket support portions. In addition, it may be possible to prevent coolant from being introduced into an air manifold or a hydrogen manifold due to leakage of the coolant at the portion in which the contact pressure of the airtight line deteriorates.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel cell separator, comprising:
   a gasket having cooling surface-side and reaction surface-side airtight lines, formed between a manifold portion and a passage surface of the fuel cell separator; and
   a gasket support portion formed integrally with each of the airtight lines,
   wherein the gasket includes a sub-airtight line connected to but not abutting the reaction surface-side airtight line in a region of a reaction surface of the separator in which a gas aperture is not formed, and the sub-airtight line is formed in the region of the reaction surface of the separator that coincides with the cooling surface-side hydrogen airtight line.

2. The fuel cell separator of claim 1, wherein the gasket includes:
   an air sub-airtight line, as a sub-airtight line formed on an anode reaction surface of the separator, connected to an anode cooling surface-side air airtight line, formed between an air manifold and an anode cooling surface of the separator, in a region in which a hydrogen aperture is not formed in a region of the anode reaction surface that corresponds to the anode cooling surface-side air airtight line.

3. The fuel cell separator of claim 2, wherein the air sub-airtight line has a structure in which tips of gasket support portions formed between the air manifold and the anode reaction surface of the separator are integrally connected, and extends toward the anode reaction surface.

4. The fuel cell separator of claim 1, wherein the gasket includes:
   a hydrogen sub-airtight line, as a sub-airtight line formed on a cathode reaction surface of the separator, connected to a cathode cooling surface-side hydrogen airtight line, formed between a hydrogen manifold and a cathode cooling surface of the separator, in a region in which an air aperture is not formed in a region of the cathode reaction surface that corresponds to the cathode cooling surface-side hydrogen airtight line.

5. The fuel cell separator of claim 4, wherein the hydrogen sub-airtight line has a structure in which tips of gasket support portions formed between the hydrogen manifold and the cathode reaction surface of the separator are integrally connected, and extends toward the cathode reaction surface.

6. The fuel cell separator of claim 2, wherein the air sub-airtight line has a width which is equal to or greater than half a width of an air airtight line formed between the air manifold and the anode reaction surface, and which is equal to or less than twice the width of the air airtight line.

7. The fuel cell separator of claim 4, wherein the hydrogen sub-airtight line has a width which is equal to or greater than half a width of a hydrogen airtight line formed between the hydrogen manifold and the cathode reaction surface, and which is equal to or less than twice the width of the hydrogen airtight line.

8. A fuel cell separator, comprising:
a gasket having cooling surface-side and reaction surface-side airtight lines, formed between a manifold portion and a passage surface of the fuel cell separator; and
a gasket support portion formed integrally with each of the airtight lines,
wherein the gasket includes a sub-airtight line connected to but not abutting the reaction surface-side airtight line in a region of a reaction surface of the separator in which a gas aperture is not formed, and the sub-airtight line is formed in the region of the reaction surface of the separator that corresponds to the cooling surface-side airtight line, and
wherein the sub-airtight line formed at the reaction surface of the separator coincides in shape and position with the cooling surface-side airtight line formed at the cooling surface of the separator.

* * * * *